(12) United States Patent　　(10) Patent No.:　US 12,594,637 B2
　　Kubo　　　　　　　　　　　　　　(45) Date of Patent:　　Apr. 7, 2026

(54) TOOL DAMAGE DETECTION DEVICE AND COMPUTER-READABLE STORAGE MEDIUM

(71) Applicant: FANUC CORPORATION, Yamanashi (JP)

(72) Inventor: Mamoru Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 400 days.

(21) Appl. No.: 18/252,890

(22) PCT Filed: Nov. 22, 2021

(86) PCT No.: PCT/JP2021/042857
　　§ 371 (c)(1),
　　(2) Date: May 15, 2023

(87) PCT Pub. No.: WO2022/113957
　　PCT Pub. Date: Jun. 2, 2022

(65) Prior Publication Data
　　US 2024/0024999 A1　　Jan. 25, 2024

(30) Foreign Application Priority Data

Nov. 25, 2020　(JP) ................................. 2020-194944

(51) Int. Cl.
　　*B23Q 17/09*　　　　(2006.01)
(52) U.S. Cl.
　　CPC ................................... *B23Q 17/09* (2013.01)
(58) Field of Classification Search
　　CPC ...... G05B 19/4065; G05B 2219/50203; B23Q
　　　　　　　　　　　　　　　17/09; B23Q 17/0961
　　See application file for complete search history.

(56) References Cited

U.S. PATENT DOCUMENTS

| | | | |
|---|---|---|---|
| 5,247,452 A | 9/1993 | Ueda et al. | |
| 6,526,359 B1 * | 2/2003 | Dzombak | .............. G01R 21/06 |
| | | | 702/60 |
| 2012/0296475 A1 * | 11/2012 | Maekawa | .............. G05B 19/19 |
| | | | 700/275 |

FOREIGN PATENT DOCUMENTS

| | | |
|---|---|---|
| JP | S52-095386 A | 8/1977 |
| JP | S60-127957 A | 7/1985 |
| JP | H03-049849 A | 3/1991 |
| JP | H04-075855 A | 3/1992 |
| JP | H06-050714 U | 7/1994 |
| JP | 3117939 U | 1/2006 |

(Continued)

OTHER PUBLICATIONS

International Search Report in PCT/JP2021/042857, mailed Dec. 28, 2021. 3pp.

*Primary Examiner* — Jennifer Bahls
(74) *Attorney, Agent, or Firm* — HAUPTMAN HAM, LLP

(57)　　　　　　ABSTRACT

A tool damage detection device includes: a data acquisition unit that acquires load data indicating a load of a spindle and rotational speed data indicating a rotational speed of the spindle in a cutting feed section; an extraction unit that extracts, from the load data, evaluation data to be used for evaluation of occurrence of damage to a tool based on the rotational speed data; a detection unit that detects occurrence of damage to the tool using the evaluation data; and an output unit that outputs data indicating occurrence of damage to the tool when the detection unit detects the damage to the tool.

9 Claims, 7 Drawing Sheets

(56)  References Cited

FOREIGN PATENT DOCUMENTS

| | | | |
|---|---|---|---|
| JP | 2020-178454 | A | 10/2020 |
| KR | 10-2018-0133974 | A | 12/2018 |
| KR | 10-2019-0001371 | A | 1/2019 |

* cited by examiner

TOOL DAMAGE DETECTION DEVICE AND COMPUTER-READABLE STORAGE MEDIUM

RELATED APPLICATIONS

The present application is a National Phase of International Application No. PCT/JP2021/042857 filed Nov. 22, 2021, which claims priority to Japanese Application No. 2020-194944 filed Nov. 25, 2020.

TECHNICAL FIELD

The present invention relates to a tool damage detection device and a computer-readable storage medium.

BACKGROUND ART

Conventionally, damage detection of a tool has been performed in a machine tool. In a case where the damage detection of the tool is performed, for example, time-series data indicating a load applied to the spindle in a section from the start to the stop of the rotation of the tool is acquired. Then, the time-series data in the acquired section is compared with reference time-series data, and the damage to the tool is detected (For example, Patent Literature 1).

CITATION LIST

Patent Literature

Patent Literature 1: JP S52-95386 A

SUMMARY OF INVENTION

Technical Problem

However, for example, as in a case where tapping is performed, the load data acquired from the start to the end of the machining cycle may include data during a large change in load due to acceleration/deceleration torque and data indicating the load at the time of non-cutting.

In this case, the acquired load data does not accurately indicate the load applied to the spindle in the section in which machining is actually performed by the tool. Therefore, even if the damage detection of the tool is performed using such load data, there is a possibility that the damage to the tool cannot be accurately detected.

An object of the present invention is to reliably detect damage to a tool by accurately capturing characteristics of a load applied to a spindle.

Solution to Problem

A tool damage detection device includes: a data acquisition unit that acquires load data indicating a load of a spindle in a cutting feed section and rotational speed data indicating a rotational speed of the spindle; an extraction unit that extracts, from the load data, evaluation data to be used for evaluation of occurrence of damage to a tool based on the rotational speed data; a detection unit that detects occurrence of damage to the tool using the evaluation data; and an output unit that outputs data indicating occurrence of damage to the tool when the detection unit detects the damage to the tool.

A computer-readable storage medium stores an instruction that causes a computer to: acquire load data indicating a load of a spindle in a cutting feed section and rotational speed data indicating a rotational speed of the spindle; extract, from the load data, evaluation data to be used for evaluation of occurrence of damage to a tool based on the rotational speed data; detect occurrence of damage to the tool using the evaluation data; and output data indicating occurrence of damage to the tool when the damage to the tool is detected.

Advantageous Effects of Invention

According to the present invention, the damage to the tool can be reliably detected by accurately capturing the feature of the load applied to the spindle.

DESCRIPTION OF EMBODIMENTS

Hereinafter, an embodiment of the present invention will be described with reference to the drawings. Note that not all combinations of features described in the following embodiments are necessarily required for solving the problem. Further, an unnecessarily detailed description may be omitted. The following description of the embodiments and the drawings are provided for those skilled in the art to fully understand the present invention, and are not intended to limit the scope of the claims.

The tool damage detection device is a device that detects damage to a tool during or after operation of a machine tool. The damage to the tool is, for example, breakage or breakdown of the tool.

The tool damage detection device is, for example, a numerical controller of a machine tool. The tool damage detection device may be a computer such as a management server that manages the operating state of the machine tool. Hereinafter, an example in which the tool damage detection device is a numerical controller will be described.

Figure 1:
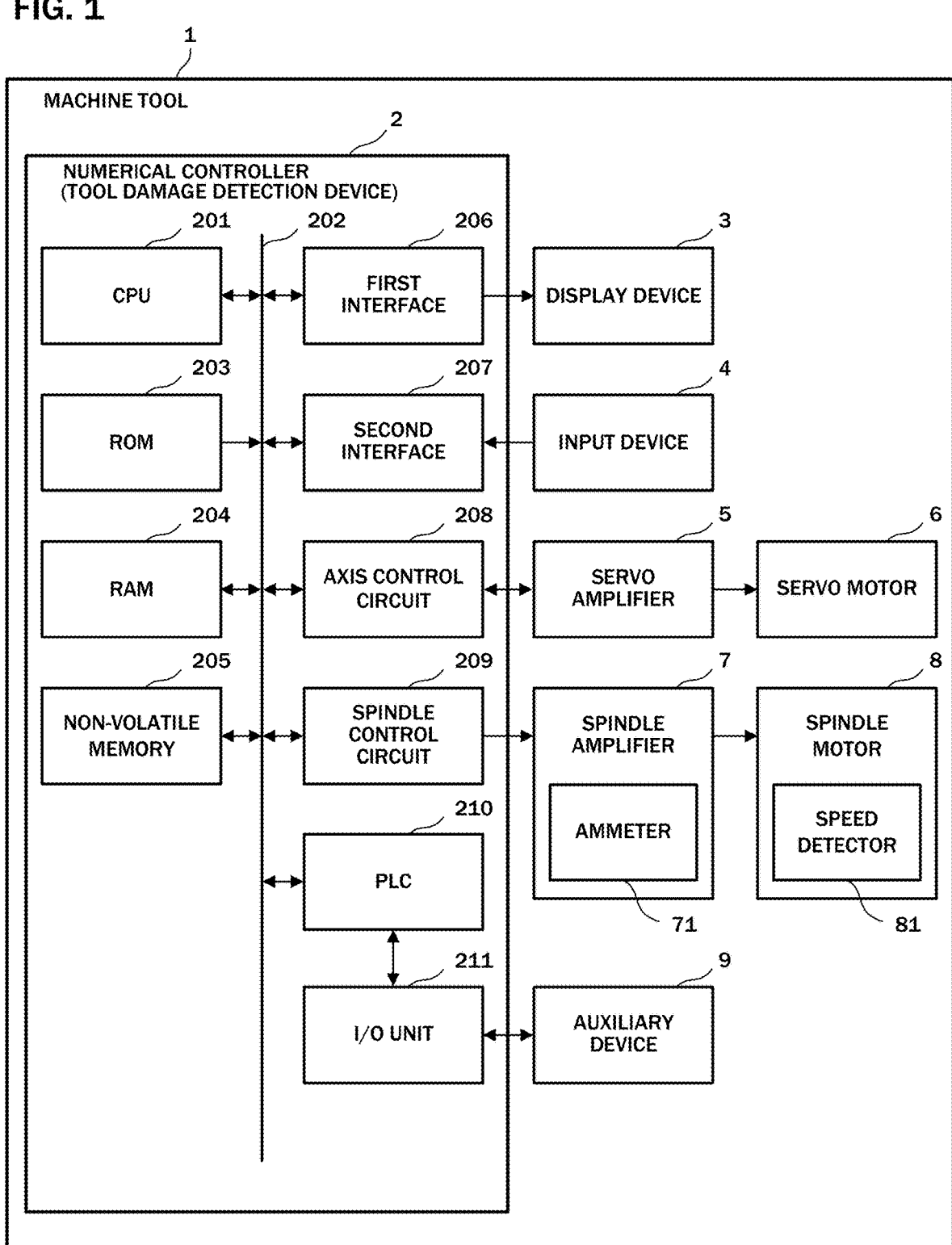
FIG. 1 is a diagram illustrating an example of a hardware configuration of a machine tool.

FIG. 1 is a diagram illustrating an example of a hardware configuration of a machine tool. A machine tool 1 is, for example, a machining center, a multitasking machine, a drilling machine, or a tapping center. The machine tool 1 includes a numerical controller 2, a display device 3, an input device 4, a servo amplifier 5 and a servo motor 6, a spindle amplifier 7 and a spindle motor 8, and an auxiliary device 9.

The numerical controller 2 is a controller that controls the entire machine tool 1. The numerical controller 2 includes a CPU 201, a bus 202, a ROM 203, a RAM 204, and a non-volatile memory 205.

The CPU 201 is a processor that controls the entire numerical controller 2 according to a system program. The CPU 201 reads a system program and the like stored in the ROM 203 via the bus 202. Furthermore, the CPU 201 controls the servo motor 6 and the spindle motor 8 according to the machining program.

The bus 202 is a communication path that interconnects individual pieces of hardware in the numerical controller 2. The individual pieces of hardware in the numerical controller 2 exchange data via the bus 202.

The ROM 203 is a storage device or a storage medium that stores a system program and the like for controlling the entire numerical controller 2.

The RAM 204 is a storage device that temporarily stores various data. The RAM 204 functions as a work area for the CPU 201 to process various data.

The non-volatile memory 205 is a storage device that retains data even in a state where the power supply of the machine tool 1 is turned off and no power is supplied to the numerical controller 2. The non-volatile memory 205 includes, for example, a solid state drive (SSD).

The numerical controller 2 further includes a first interface 206, a second interface 207, an axis control circuit 208, a spindle control circuit 209, a programmable logic controller (PLC) 210, and an I/O unit 211.

The first interface 206 is an interface that connects the bus 202 and the display device 3. The first interface 206 sends, for example, various data processed by the CPU 201 to the display device 3.

The display device 3 is a device that receives various data via the first interface 206 and displays the various data. The display device 3 is a display such as a liquid crystal display (LCD).

The second interface 207 is an interface that connects the bus 202 and the input device 4. The second interface 207 sends, for example, data input from the input device 4 to the CPU 201 via the bus 202.

The input device 4 is a device for inputting various data. The input device 4 is, for example, a keyboard and a mouse. Note that the input device 4 and the display device 3 may be configured as one device such as a touch panel, for example.

The axis control circuit 208 is a circuit that controls the servo motor 6. The axis control circuit 208 receives a control command from the CPU 201 and outputs a command for driving the servo motor 6 to the servo amplifier 5. The axis control circuit 208 sends, for example, a torque command for controlling the torque of the servo motor 6 to the servo amplifier 5.

The servo amplifier 5 receives a command from the axis control circuit 208 and supplies current to the servo motor 6.

The servo motor 6 is driven by a current supplied from the servo amplifier 5. The servo motor 6 is connected to, for example, a ball screw for driving a tool rest, a spindle head and a table. When the servo motor 6 is driven, a structure of the machine tool 1, such as a tool rest, a spindle head, or a table moves, for example, in the X-axis direction, the Y-axis direction, or the Z-axis direction.

The spindle control circuit 209 is a circuit for controlling the spindle motor 8. The spindle control circuit 209 receives a control command from the CPU 201 and outputs a command for driving the spindle motor 8 to the spindle amplifier 7. The spindle control circuit 209 sends, for example, a torque command for controlling the torque of the spindle motor 8 to the spindle amplifier 7.

The spindle amplifier 7 receives a command from the spindle control circuit 209 and supplies a current to the spindle motor 8. The spindle amplifier 7 incorporates an ammeter 71 that measures the current value of the current supplied to the spindle motor 8.

The ammeter 71 measures a current value of the current supplied to the spindle motor 8. The current value measured by the ammeter 71 is used for load detection of the spindle.

The spindle motor 8 is driven by a current supplied from the spindle amplifier 7. The spindle motor 8 is coupled to the spindle and rotates the spindle. The spindle motor 8 includes a speed detector 81 that detects a rotational speed of the spindle motor 8.

The speed detector 81 detects the rotational speed of the spindle motor 8. The data indicating the rotational speed of the spindle motor 8 detected by the speed detector 81 is used for extraction of reference load data and evaluation data for detecting occurrence of damage to the tool. The reference load data and the evaluation data will be described in detail later.

The PLC 210 is a device that executes a ladder program to control the auxiliary device 9. The PLC 210 controls the auxiliary device 9 via the I/O unit 211.

The I/O unit 211 is an interface that connects the PLC 210 and the auxiliary device 9. The I/O unit 211 sends a command received from the PLC 210 to the auxiliary device 9.

The auxiliary device 9 is installed in the machine tool 1 and performs an auxiliary operation when the machine tool 1 machines a workpiece. The auxiliary device 9 may be a device installed around the machine tool 1. The auxiliary device 9 is, for example, a tool changer, a cutting liquid injection device, or an opening/closing door drive device.

Next, an example of the functions of the numerical controller 2 will be described.

Figure 2:
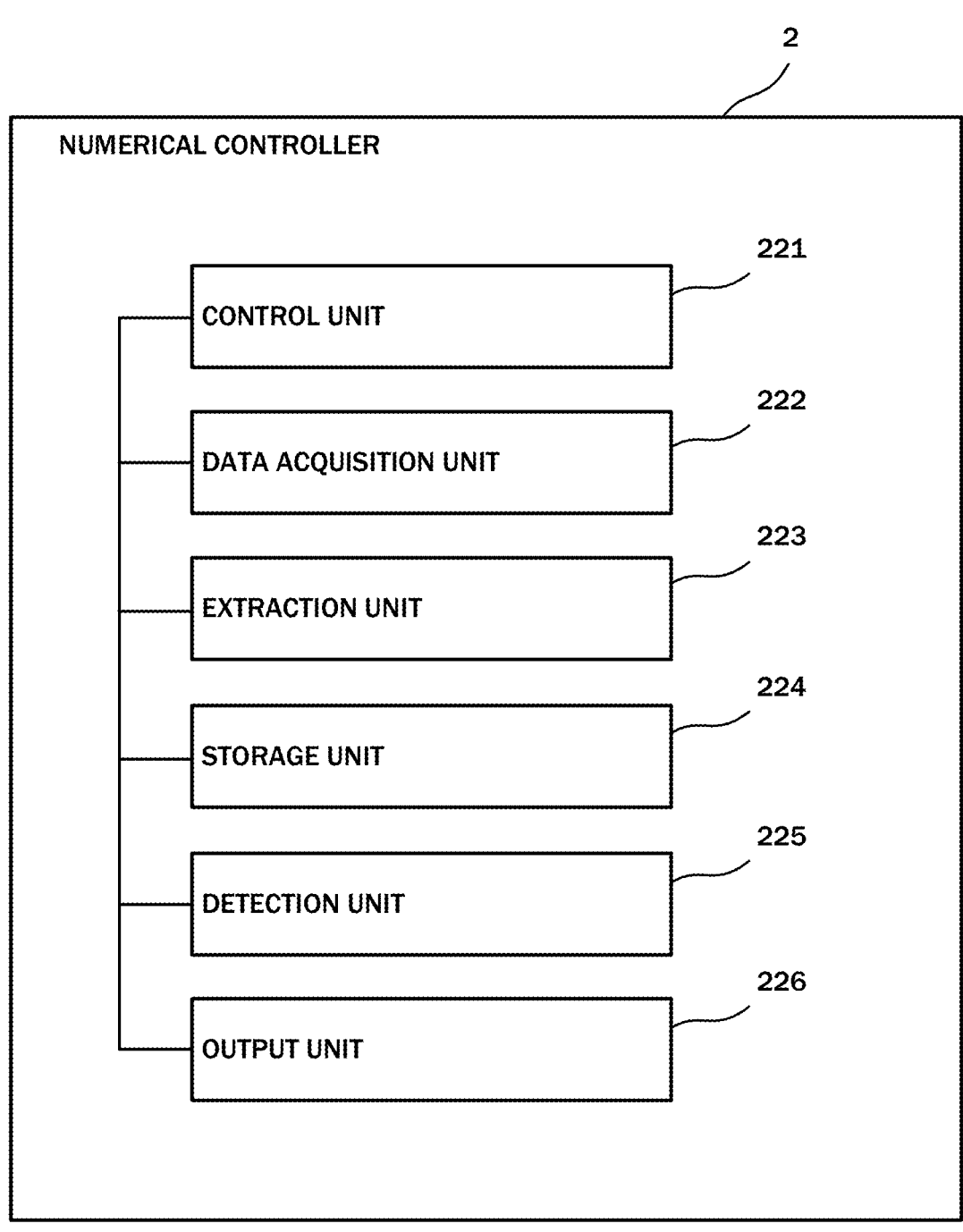
FIG. 2 is a block diagram illustrating an example of functions of a numerical controller.

FIG. 2 is a block diagram illustrating an example of functions of the numerical controller 2. The numerical controller 2 includes a control unit 221, a data acquisition unit 222, an extraction unit 223, a storage unit 224, a detection unit 225, and an output unit 226.

The control unit 221, the data acquisition unit 222, the extraction unit 223, the detection unit 225, and the output unit 226 are realized, for example, by the CPU 201 performing arithmetic processing using the system program and various data stored in the ROM 203. The CPU 201 executes arithmetic processing using the RAM 204 as a work area. The storage unit 224 is realized by storing data input from the input device 4 or the like or a calculation result of arithmetic processing by the CPU 201 in the RAM 204 or the non-volatile memory 205.

The control unit 221 controls each unit of the machine tool 1. The control unit 221 also reads the machining program and analyzes the machining program. The control unit 221 executes the analyzed machining program to control the servo motor 6 and the spindle motor 8. Thus, the workpiece is machined. Furthermore, the control unit 221 controls the operation of the auxiliary device 9 and the like.

The data acquisition unit 222 acquires load data indicating the load of the spindle and rotational speed data indicating the rotational speed of the spindle in the cutting feed section.

The cutting feed section is a section in which the tool moves by cutting feed. The section in which the tool is moving by cutting feed is, for example, a section in which the tool is moving by a linear interpolation command "G01", a circular interpolation command "G02", or "G03" described in the machining program. That is, the cutting feed section does not include a rapid traverse section in which the tool is moved by rapid traverse. In the cutting feed section, the numerical controller 2 outputs a cutting signal. The cutting signal is, for example, a speed control signal for the control unit 221 to perform speed control of the servo motor.

The load data indicating the load of the spindle is time-series data indicating the load applied in the rotation direction of the spindle. The load data is represented by, for example, a current value of a current supplied to the spindle motor 8. The load data is, for example, time-series data of values measured by the ammeter 71 built in the spindle amplifier 7. In addition, the load data may be time-series data indicating a value of power supplied to the spindle motor 8. The load data is acquired every 1 [ms], for example.

The rotational speed data indicating the rotational speed of the spindle is time-series data indicating the rotational speed of the spindle. The rotational speed data is, for example, time-series data of a value detected by the speed detector 81 provided in the spindle motor 8. When the spindle rotates forward, the rotational speed data indicates a positive value. When the spindle rotates backward, the rotational speed data indicates a negative value. The rotational speed data is acquired, for example, every 1 [ms].

For example, the data acquisition unit 222 acquires the load data and the rotational speed data when the workpiece is machined first and when the second and subsequent workpieces are machined by a normal tool. The normal tool is a tool in which wear, damage, or the like does not occur.

The extraction unit 223 extracts reference load data serving as a reference for detecting damage to the tool based on the load data and the rotational speed data acquired when the workpiece is first machined by the normal tool. In addition, the extraction unit 223 extracts evaluation data used for evaluation of occurrence of damage to the tool based on the load data and the rotational speed data acquired when the second and subsequent workpieces are machined.

The extraction unit 223 extracts, as evaluation data, load data in a cutting feed section in which the spindle rotates forward and the rotational speed is constant. Here, it is sufficient that the rotational speed is substantially constant, and for example, even when the rotational speed slightly fluctuates during cutting, the rotational speed is considered to be constant.

The extraction unit 223 extracts, for example, load data in a section in which the spindle rotates at $\pm 10$ [min$^{-1}$] of the rotational speed instructed by the machining program, as reference load data or evaluation data.

Figure 3:
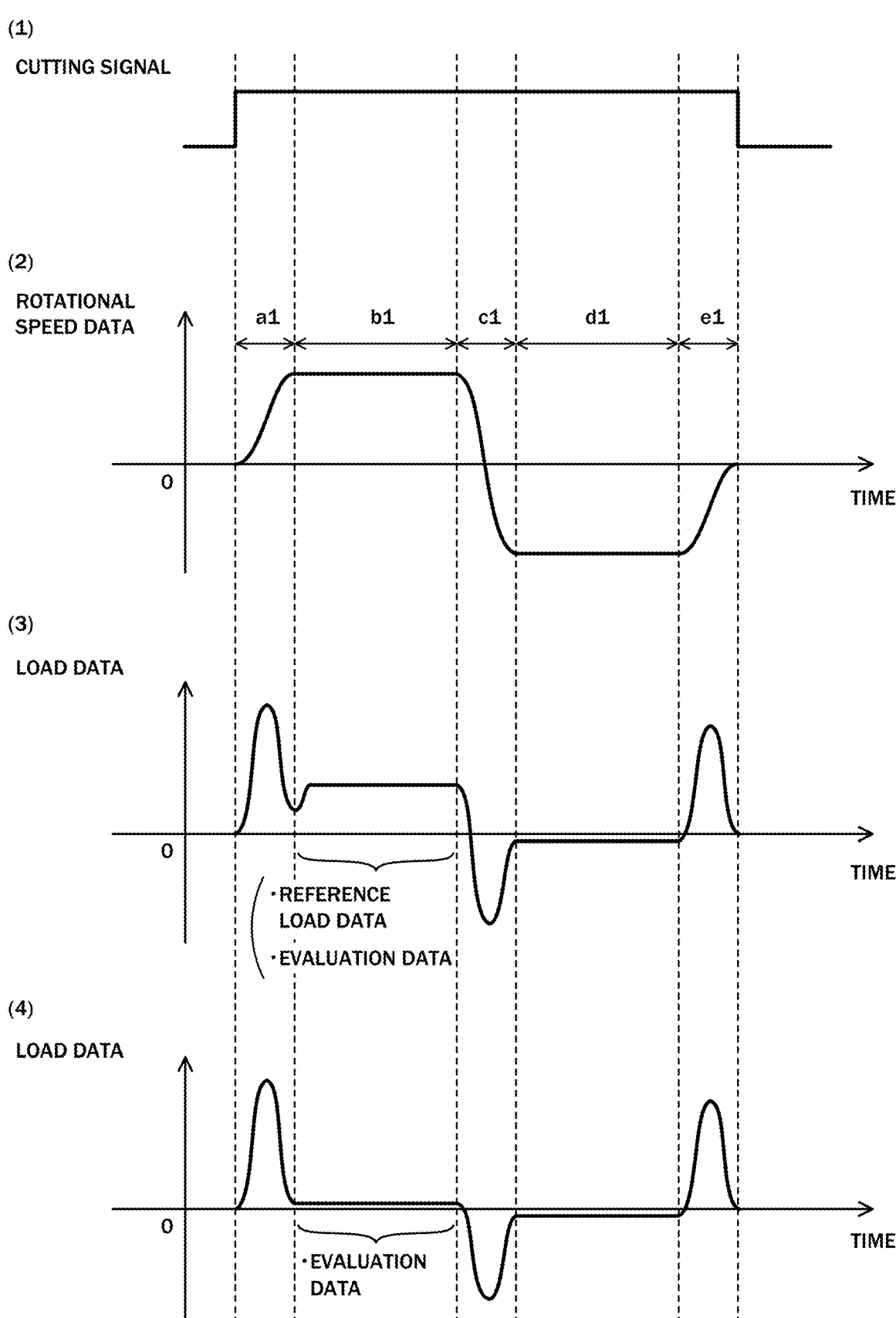
FIG. 3 is a diagram illustrating an example of each data acquired by a data acquisition unit at the time of tapping.

FIG. 3 is a diagram illustrating an example of each data acquired by the data acquisition unit 222 at the time of tapping. (1) in FIG. 3 illustrates data indicating a cutting signal, (2) in FIG. 3 illustrates rotational speed data, (3) in FIG. 3 illustrates load data acquired at the time of machining the first workpiece by the normal tool, and (4) in FIG. 3 illustrates load data acquired in a state where the tap is broken.

The tapping is executed by a tapping cycle command. In the tapping cycle, when the cutting signal is output, the spindle starts to rotate and the tool moves in the negative direction of the Z-axis depending on the pitch of the screw.

After the rotation of the spindle is started, the rotational speed rapidly increases until the rotational speed reaches the command speed (section a1 in (2) in FIG. 3). That is, since the rotational speed of the spindle is not constant in this section, the extraction unit 223 does not extract the load data in this section as the reference load data or the evaluation data. Note that the load applied in the rotation direction of the spindle greatly changes due to the acceleration/deceleration torque until the rotational speed reaches the command speed after the rotation of the spindle is started.

When the spindle reaches the command speed, the rotational speed of the spindle becomes constant (section b1 in (2) in FIG. 3). Therefore, the extraction unit 223 extracts the load data in this section as the reference load data or the evaluation data. Note that when the tap comes into contact with the workpiece and cutting is performed, the load applied to the spindle increases.

When the tool reaches the bottom of the hole and the rotation direction of the spindle is reversed (section c1 in (2) in FIG. 3), the rotational speed of the spindle rapidly decreases from the command speed. That is, since the rotational speed of the spindle is not constant in this section, the extraction unit 223 does not extract the load data in this section as the reference load data or the evaluation data. Note that the load applied in the rotation direction of the spindle greatly changes due to the acceleration/deceleration torque when the rotation direction of the spindle is reversed.

Also when the tool returns to the cutting start position and the spindle stops (section e1 in (2) in FIG. 3), the rotational speed of the spindle rapidly increases. That is, since the rotational speed of the spindle is not constant in this section, the extraction unit 223 does not extract the load data in this section as the reference load data or the evaluation data. Note that the load applied in the rotation direction of the spindle greatly changes due to the acceleration/deceleration torque when the tool returns to the cutting start position and the spindle stops.

The rotational speed of the spindle has a negative value while the spindle rotates backward (section d1 in (2) in FIG. 3). Therefore, the extraction unit 223 does not extract the load data in this section as the reference load data or the evaluation data. Note that while the spindle rotates backward and the tool returns to the cutting start position along the machining path, the tool is in a non-cutting state.

As described above, (3) in FIG. 3 illustrates the load data acquired at the time of machining the first workpiece. Therefore, the data extracted from the load data illustrated in (3) in FIG. 3 is the reference load data. The evaluation data extracted from the start of machining of the second and subsequent workpieces before the occurrence of damage to the tool is substantially the same data as the load data illustrated in (3) in FIG. 3.

As described above, (4) in FIG. 3 illustrates load data acquired in a state where the tap is broken. That is, data extracted from the load data illustrated in (4) in FIG. 3 is evaluation data when damage to the tool occurs.

Figure 4:
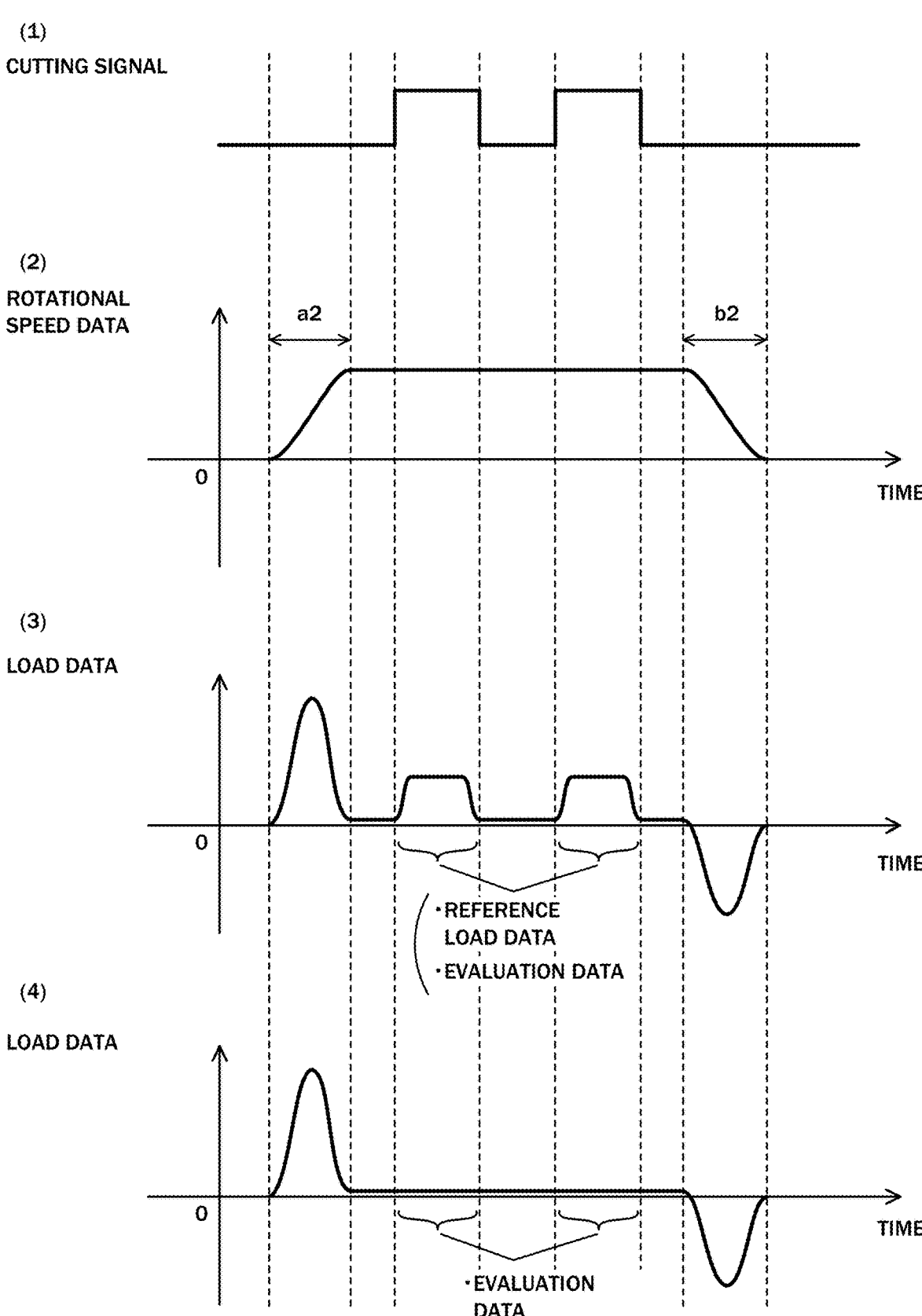
FIG. 4 is a diagram illustrating an example of each data acquired by the data acquisition unit at the time of milling.

FIG. 4 is a diagram illustrating an example of each data acquired by the data acquisition unit 222 at the time of milling. (1) in FIG. 4 illustrates data indicating a cutting signal, (2) in FIG. 4 illustrates rotational speed data, (3) in FIG. 4 illustrates load data acquired at the time of machining the first workpiece, and (4) in FIG. 4 illustrates load data acquired in a state where the milling cutter is broken.

As illustrated in FIG. 4, a section (section a2 in (2) in FIG. 4) until the rotational speed reaches the command speed after the rotation of the spindle is started and a section (section b2 in (2) in FIG. 4) from the state in which the spindle is rotating at the command speed to the stop are not included in the cutting feed section in milling. Further, in the milling, the spindle does not rotate backward.

That is, when the milling is performed, the spindle rotates forward and the rotational speed of the spindle is constant in the cutting feed section. Therefore, the extraction unit 223 extracts the entire cutting feed section as the reference load data or the evaluation data.

As described above, (3) in FIG. 4 illustrates the load data at the time of machining the first workpiece. That is, the data extracted from the load data illustrated in (3) in FIG. 4 is the reference load data. In addition, the evaluation data extracted from the start of machining of the second and subsequent workpieces before the occurrence of damage to the tool is substantially the same data as the load data illustrated in (3) in FIG. 4.

As described above, (4) in FIG. 4 illustrates load data acquired in a state where the milling cutter is broken. That is, data extracted from the load data illustrated in (4) in FIG. 4 is evaluation data when damage to the tool occurs.

Figure 5:
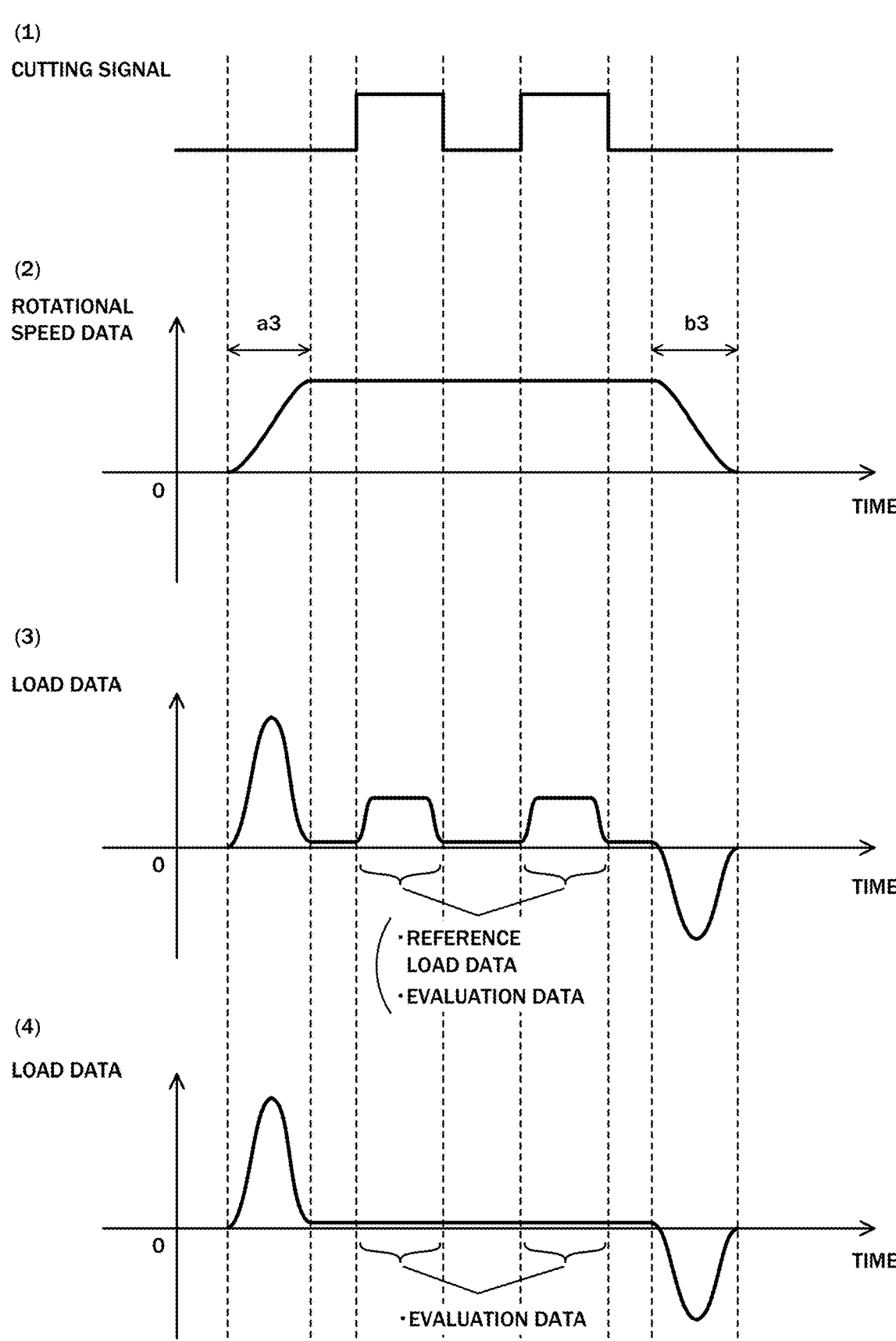
FIG. 5 is a diagram illustrating an example of each data acquired by the data acquisition unit at the time of drilling.

FIG. 5 is a diagram illustrating an example of each data acquired by the data acquisition unit 222 at the time of drilling. (1) in FIG. 5 illustrates data indicating a cutting signal, (2) in FIG. 5 illustrates rotational speed data, (3) in FIG. 5 illustrates load data acquired at the time of machining the first workpiece, and (4) in FIG. 5 illustrates load data acquired in a state where the drill is broken.

As illustrated in FIG. 5, a section (section a3 in (2) in FIG. 5) until the rotational speed reaches the command speed after the rotation of the spindle is started and a section (section b3 in (2) in FIG. 5) from the state in which the spindle is rotating at the command speed to the stop are not included in the cutting feed section in drilling. Further, in the drilling, the spindle does not rotate backward.

That is, when the drilling is performed, the spindle rotates forward in the cutting feed section, and the rotational speed of the spindle is constant. Therefore, the extraction unit 223 extracts the entire cutting feed section as the reference load data or the evaluation data.

As described above, (3) in FIG. 5 illustrates the load data at the time of machining the first workpiece. That is, the data extracted from the load data illustrated in (3) in FIG. 5 is the reference load data. In addition, the evaluation data extracted from the start of machining of the second and subsequent workpieces before the occurrence of damage to the tool is substantially the same data as the load data illustrated in (3) in FIG. 5.

As described above, (4) in FIG. 5 illustrates load data acquired in a state where the drill is broken. That is, data extracted from the load data illustrated in (4) in FIG. 5 is evaluation data when damage to the tool occurs.

Here, the description of the functions of the numerical controller 2 in FIG. 2 will be continued.

The storage unit 224 stores the reference load data and the evaluation data extracted by the extraction unit 223. The storage unit 224 stores, for example, the reference load data and the evaluation data in association with time information. The time information is, for example, information indicating a time from the start of execution of the machining program until load data extracted as the reference load data or the evaluation data is acquired.

The detection unit 225 detects the occurrence of damage to the tool using the evaluation data. The detection unit 225 detects occurrence of damage to the tool based on the reference load data and the evaluation data stored in the storage unit 224. For example, the detection unit 225 detects the occurrence of damage to the tool by comparing the reference load data with the evaluation data. For example, the detection unit 225 determines the evaluation data and the reference load data corresponding to the evaluation data, based on the time information. The detection unit 225 detects the occurrence of damage to the tool by comparing the evaluation data with the reference load data corresponding to the evaluation data.

For example, when the tool is broken in tapping, milling, and drilling, the tool and the workpiece do not come into contact with each other in the cutting feed section. Therefore, the value of the evaluation data is smaller than the value of the reference load data ((3) and (4) in FIG. 3, (3) and (4) in FIG. 4, and (3) and (4) in FIG. 5). Therefore, the detection unit 225 can detect the occurrence of damage to the tool by comparing the reference load data with the evaluation data.

The detection unit 225 detects the occurrence of damage to the tool based on at least one of the maximum value, the minimum value, and the average value of the reference load data and at least one of the maximum value, the minimum value, and the average value of the evaluation data. For example, the detection unit 225 compares the average value of the reference load data with the average value of the evaluation data to detect whether the tool is damaged.

The detection unit 225 may calculate at least one threshold from at least one of the maximum value, the minimum value, and the average value of the reference load data, compare the calculated at least one threshold with at least one of the maximum value, the minimum value, and the average value of the evaluation data, and detect the occurrence of damage to the tool. For example, the detection unit 225 calculates a value corresponding to 50% of the average value of the reference load data as the threshold. When the average value of the evaluation data is less than 50% of the average value of the reference load data, the detection unit 225 detects that the tool is damaged.

When the damage to the tool is detected by the detection unit 225, the output unit 226 outputs data indicating the occurrence of the damage to the tool. The output unit 226 outputs, for example, data indicating occurrence of damage to the tool to the display device 3. When receiving the data indicating the occurrence of the damage to the tool, the display device 3 displays the occurrence of the damage to the tool on the screen.

If the detection unit 225 detects data indicating the occurrence of the damage to the tool, the control unit 221 may issue an alarm indicating the occurrence of the damage to the tool, for example. In addition, the control unit 221 may stop the operation of the machine tool 1 when an alarm is issued.

Next, a flow of processing executed in the numerical controller 2 will be described.

Figure 6:
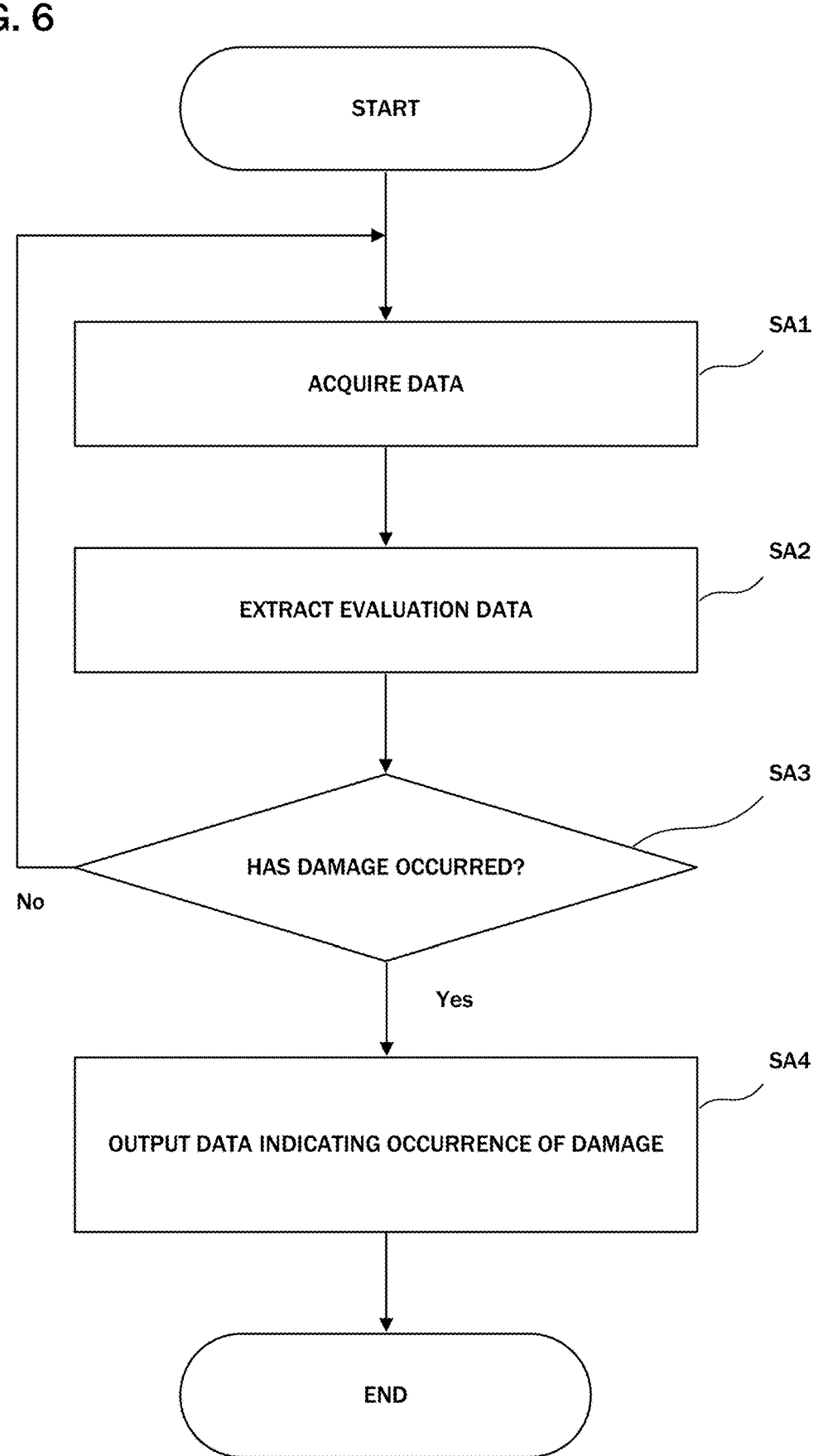
FIG. 6 is a flowchart illustrating an example of a flow of processing executed in a numerical controller.

FIG. 6 is a flowchart illustrating an example of a flow of processing executed in the numerical controller 2.

In the numerical controller 2, first, the data acquisition unit 222 acquires load data indicating the load of the spindle and rotational speed data indicating the rotational speed of the spindle in the cutting feed section (step SA1).

Next, the extraction unit 223 extracts evaluation data to be used for evaluation of occurrence of damage to the tool from the load data based on the rotational speed data. At this time, the extraction unit 223 extracts, as evaluation data, load data in a cutting feed section in which the spindle rotates forward and the rotational speed is constant (step SA2).

Next, the detection unit 225 detects the occurrence of damage to the tool using the evaluation data (step SA3). That is, the detection unit 225 determines whether the tool is damaged by using the evaluation data.

When the damage to the tool is detected by the detection unit 225 (in the case of Yes in step SA3), the output unit 226 outputs data indicating the occurrence of the damage to the tool (step SA4), and ends the processing. For example, the output unit 226 outputs data indicating the occurrence of damage to the tool to the display device 3 of the numerical controller 2, and causes the display device 3 to display data indicating the occurrence of the damage to the tool.

When the damage to the tool is not detected (in the case of No in step SA3), the process returns to step SA1, and the acquisition of the load data and the rotational speed data is continued.

As described above, the tool damage detection device 2 includes: the data acquisition unit 222 that acquires the load data indicating the load of the spindle and the rotational speed data indicating the rotational speed of the spindle in the cutting feed section; the extraction unit 223 that extracts, from the load data, the evaluation data to be used for evaluation of the occurrence of damage to the tool based on the rotational speed data; the detection unit 225 that detects occurrence of damage to the tool using the evaluation data; and the output unit 226 that outputs data indicating occurrence of damage to the tool when the damage to the tool is detected by the detection unit 225. Therefore, the damage to the tool can be reliably detected by accurately capturing the feature of the load applied to the spindle.

The evaluation data is load data in a cutting feed section in which the spindle rotates forward and the rotational speed of the spindle is constant. Using such data as the evaluation data makes it possible to reliably detect damage to the tool in various machining such as tapping, milling, and drilling.

The extraction unit 223 further extracts reference load data serving as a reference for detecting the damage to the tool from the load data, and the detection unit 225 detects the occurrence of the damage to the tool based on the reference load data and the evaluation data. In addition, the detection unit 225 detects the occurrence of damage to the tool based on at least one of the maximum value, the minimum value, and the average value of the reference load data and at least one of the maximum value, the minimum value, and the average value of the evaluation data. Therefore, the load of the data processing in the detection unit 225 is reduced as compared with the case of comparing all the time-series data.

Furthermore, the detection unit 225 calculates at least one threshold from at least one of the maximum value, the minimum value, and the average value of the reference load data, compares the calculated at least one threshold with at least one of the maximum value, the minimum value, and the average value of the evaluation data, and detects the occurrence of damage to the tool. Therefore, the threshold is automatically calculated regardless of the experience of the worker, which reduces the burden on the worker.

In the above-described embodiment, the evaluation data is extracted based on the rotational speed data. However, the present invention is not limited to such an embodiment, and the evaluation data may be extracted depending on the type of machining.

In this case, the data acquisition unit 222 acquires coordinate value data indicating the coordinate value of the cutting point, and the extraction unit 223 determines the type of machining performed by the tool based on only the coordinate value data or based on the rotational speed data and the coordinate value data, and extracts the evaluation data depending on the type of machining.

The coordinate value data indicating the coordinate value of the cutting point is, for example, time-series data indicating the coordinate value of the movement path of the tool in the workpiece coordinate system. The coordinate value indicating the cutting point is calculated based on, for example, a value detected by a linear scale (not illustrated) arranged in each direction of the X axis, the Y axis, and the Z axis.

For example, the extraction unit 223 detects the movement direction of the tool from the coordinate value data and determines the type of machining. For example, when, in the cutting feed section, the tool moves in the X-axis direction or the Y-axis direction but does not move in the Z-axis direction, the extraction unit 223 determines that the type of machining is milling.

In addition, in a case where the tool movement direction is only the Z-axis direction in the cutting feed section, the extraction unit 223 determines that the type of machining is tapping or drilling.

Further, when the movement direction of the tool is only the Z-axis direction in the cutting feed section and the cutting feed section includes a section in which the rotational speed of the tool takes a negative value, that is, when the cutting feed section includes a section in which the tool rotates backward, the extraction unit 223 determines that the type of machining is tapping. When the cutting feed section does not include a section in which the tool rotates backward, the extraction unit 223 determines that the type of machining is drilling.

Alternatively, when the rotation of the spindle includes forward rotation and backward rotation and the rotation amount when the spindle rotates forward and the rotation amount when the spindle rotates backward are determined to be the same, the extraction unit 223 may determine that the type of machining is tapping.

When determining that the type of machining is tapping, the extraction unit 223 extracts, as reference load data or evaluation data, load data in a cutting feed section in which the spindle rotates forward and the rotational speed of the spindle is constant.

In addition, when the extraction unit 223 determines that the type of machining is milling or drilling, the entire cutting feed section is extracted as reference load data or evaluation data.

Next, a flow of processing executed in the numerical controller 2 when the type of machining is determined and the evaluation data is extracted depending on the type of machining will be described.

Figure 7:
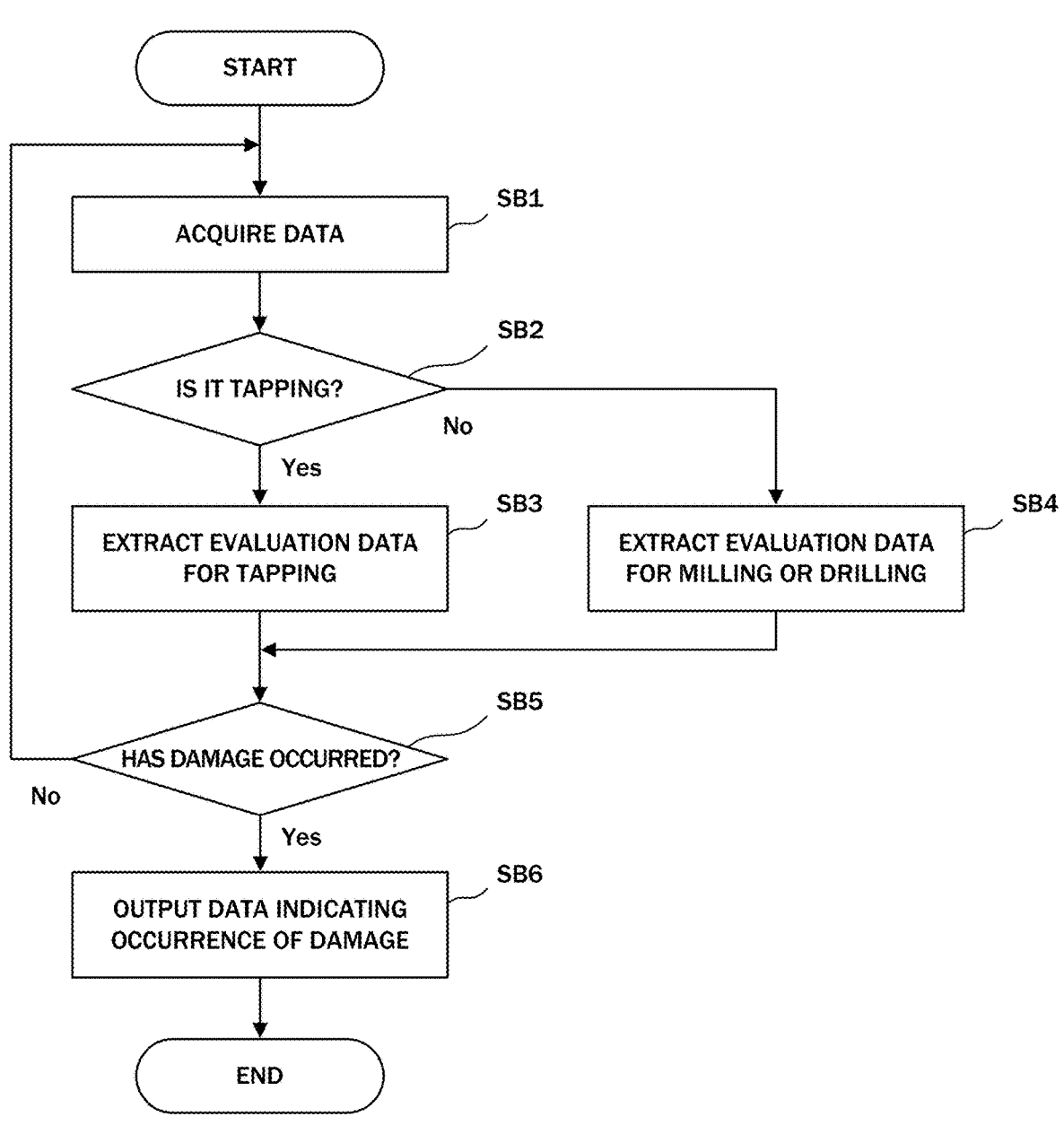
FIG. 7 is a flowchart illustrating an example of a flow of processing executed in the numerical controller.

FIG. 7 is a flowchart illustrating an example of a flow of processing executed in the numerical controller 2.

In the numerical controller 2, first, the data acquisition unit 222 acquires load data indicating the load of the spindle in the cutting feed section, rotational speed data indicating the rotational speed of the spindle, and coordinate value data indicating the coordinate value of the cutting point (step SB1).

Next, the extraction unit 223 determines the type of machining (step SB2).

When the type of machining is tapping (in the case of Yes in step SB2), the extraction unit 223 extracts evaluation data for tapping (step SB3). That is, the extraction unit 223 extracts, as evaluation data, load data in a cutting feed section in which the spindle rotates forward and the rotational speed of the spindle is constant.

When the type of machining is not tapping (in the case of No in step SB2), the extraction unit 223 extracts evaluation data for milling or drilling (step SB4). That is, the extraction unit 223 extracts the entire cutting feed section as the evaluation data.

Next, the detection unit 225 detects the occurrence of damage to the tool using the evaluation data (step SB5). That is, the detection unit 225 determines whether the tool is damaged by using the evaluation data.

When the damage to the tool is detected by the detection unit 225 (in the case of Yes in step SB5), the output unit 226 outputs data indicating the occurrence of the damage to the tool (step SB6), and ends the processing. For example, the output unit 226 outputs data indicating the occurrence of damage to the tool to the display device 3 of the numerical controller 2, and causes the display device 3 to display data indicating the occurrence of the damage to the tool.

When the damage to the tool is not detected (in the case of No in step SB5), the process returns to step SB1, and the acquisition of the load data, the rotational speed data, and the coordinate value data is continued.

As described above, the data acquisition unit 222 acquires coordinate value data indicating the coordinate value of the cutting point, and the extraction unit 223 determines the type of machining performed by the tool based on the coordinate value data or based on the rotational speed data and the coordinate value data, and extracts the evaluation data depending on the determined type of machining. When the type of machining is determined in this manner, it is not necessary to analyze the command code such as the G code described in the machining program to determine the type of machining. Therefore, the tool damage detection device can be easily implemented in the machine tool 1 that is not provided with the function of determining the type of machining based on the command code and has been already conventionally used in the factory.

In addition, when determining that the type of machining is tapping, the extraction unit 223 extracts, as reference load data or evaluation data, load data in a cutting feed section in which the spindle rotates forward and the rotational speed of the spindle is constant. This makes it possible to reliably detect damage to the tool in various machining such as tapping, milling, and drilling.

In addition, in a case where there is a low possibility that the tool is broken, such as a case where the type of machining is milling, the damage to the tool used for the machining can be excluded from the detection target by determining the type of machining. In this case, it is not necessary to store the reference load data or the evaluation data at the time of milling in the storage unit 224, which can reduce the amount of data stored in the storage unit 224.

Note that the data acquisition unit 222 may acquire coordinate value data indicating the coordinate value of the cutting point, and the extraction unit 223 may extract evaluation data used for evaluation of the occurrence of damage to the tool from the load data based on only the coordinate value data or based on the rotational speed data and the coordinate value data, without determining the type of machining.

In this case, the extraction unit 223 detects the movement direction of the tool from the coordinate value data. For example, when, in the cutting feed section, the tool moves in the X-axis direction or the Y-axis direction but does not move in the Z-axis direction, the extraction unit 223 extracts the entire cutting feed section as the evaluation data.

When the tool movement direction in the cutting feed section is the Z-axis direction and the cutting feed section includes a section in which the rotational speed of the spindle is a negative value, the extraction unit 223 extracts, as the reference load data or the evaluation data, load data in a section in which the spindle rotates forward and the rotational speed of the spindle is constant in the cutting feed section.

When the tool movement direction in the cutting feed section is the Z-axis direction and the cutting feed section does not include a section in which the rotational speed of the spindle takes a negative value, the extraction unit 223 extracts the entire cutting feed section as reference load data or evaluation data.

As a result, the extraction unit 223 can extract the evaluation data and the reference load data similarly to the case of determining the type of machining.

REFERENCE SIGNS LIST

1 Machine tool
2 Numerical controller (Tool damage detection device)
201 CPU
202 Bus
203 ROM
204 RAM
205 Non-volatile memory
206 First interface
207 Second interface
208 Axis control circuit
209 Spindle control circuit
210 PLC
211 I/O unit
221 Control unit
222 Data acquisition unit
223 Extraction unit
224 Storage unit
225 Detection unit
226 Output unit
3 Display device
4 Input device
5 Servo amplifier
6 Servo motor
7 Spindle amplifier
71 Ammeter
8 Spindle motor
81 Speed detector
9 Auxiliary device

The invention claimed is:

1. A tool damage detection device, comprising:
a data acquisition unit that acquires load data indicating a load of a spindle and rotational speed data indicating a rotational speed of the spindle in a cutting feed section;
an extraction unit that extracts, from the load data, evaluation data to be used for evaluation of occurrence of damage to a tool based on the rotational speed data;
a detection unit that detects the occurrence of damage to the tool using the evaluation data;
an output unit that outputs data indicating the occurrence of damage to the tool when the detection unit detects the damage to the tool; and
a control unit that issues an alarm indicating the occurrence of damage to the tool when the detection unit detects the damage to the tool, and stops an operation of the tool when the alarm is issued.

2. The tool damage detection device according to claim 1, wherein
the evaluation data is the load data in a section in which the spindle rotates forward and the rotational speed of the spindle is constant in the cutting feed section.

3. The tool damage detection device according to claim 1, wherein
the data acquisition unit further acquires coordinate value data indicating a coordinate value of a cutting point, and
the extraction unit determines a type of machining performed by the tool based on the coordinate value data or based on the rotational speed data and the coordinate value data, and extracts the evaluation data depending on the determined type of machining.

4. The tool damage detection device according to claim 3, wherein,
when the extraction unit determines that the type of the machining is tapping, the extraction unit extracts, as the evaluation data, the load data in a section in which the spindle rotates forward and the rotational speed of the spindle is constant in the cutting feed section.

5. The tool damage detection device according to claim 1, wherein the data acquisition unit further acquires coordinate value data indicating a coordinate value of a cutting point, and the extraction unit extracts the evaluation data to be used for evaluation of the occurrence of damage to the tool from the load data, based on the coordinate value data and the rotational speed data.

6. The tool damage detection device according to claim 1, wherein the extraction unit further extracts reference load data serving as a reference for detecting the damage to the tool from the load data, and the detection unit detects the occurrence of damage to the tool based on the reference load data and the evaluation data.

7. The tool damage detection device according to claim 6, wherein the detection unit detects the occurrence of damage to the tool based on at least one of a maximum value, a minimum value, and an average value of the reference load data and at least one of a maximum value, a minimum value, and an average value of the evaluation data.

8. The tool damage detection device according to claim 7, wherein the detection unit calculates at least one threshold from at least one of the maximum value, the minimum value, and the average value of the reference load data, and compares the calculated at least one threshold with at least one of the maximum value, the minimum value, and the average value of the evaluation data to detect the occurrence of damage to the tool.

9. A computer-readable non-transitory storage medium storing an instruction that causes a computer to:

acquire load data indicating a load of a spindle and rotational speed data indicating a rotational speed of the spindle in a cutting feed section;

extract, from the load data, evaluation data to be used for evaluation of occurrence of damage to a tool based on the rotational speed data;

detect the occurrence of damage to the tool using the evaluation data;

output data indicating the occurrence of damage to the tool when the damage to the tool is detected;

issue an alarm indicating the occurrence of damage to the tool when the damage to the tool is detected; and stop an operation of the tool when the alarm is issued.

\* \* \* \* \*